Dec. 11, 1923.
F. C. WEAVER
1,476,863
MACHINE FOR MAKING TRUE PLANE SURFACES
Filed Jan. 17, 1922
3 Sheets-Sheet 1
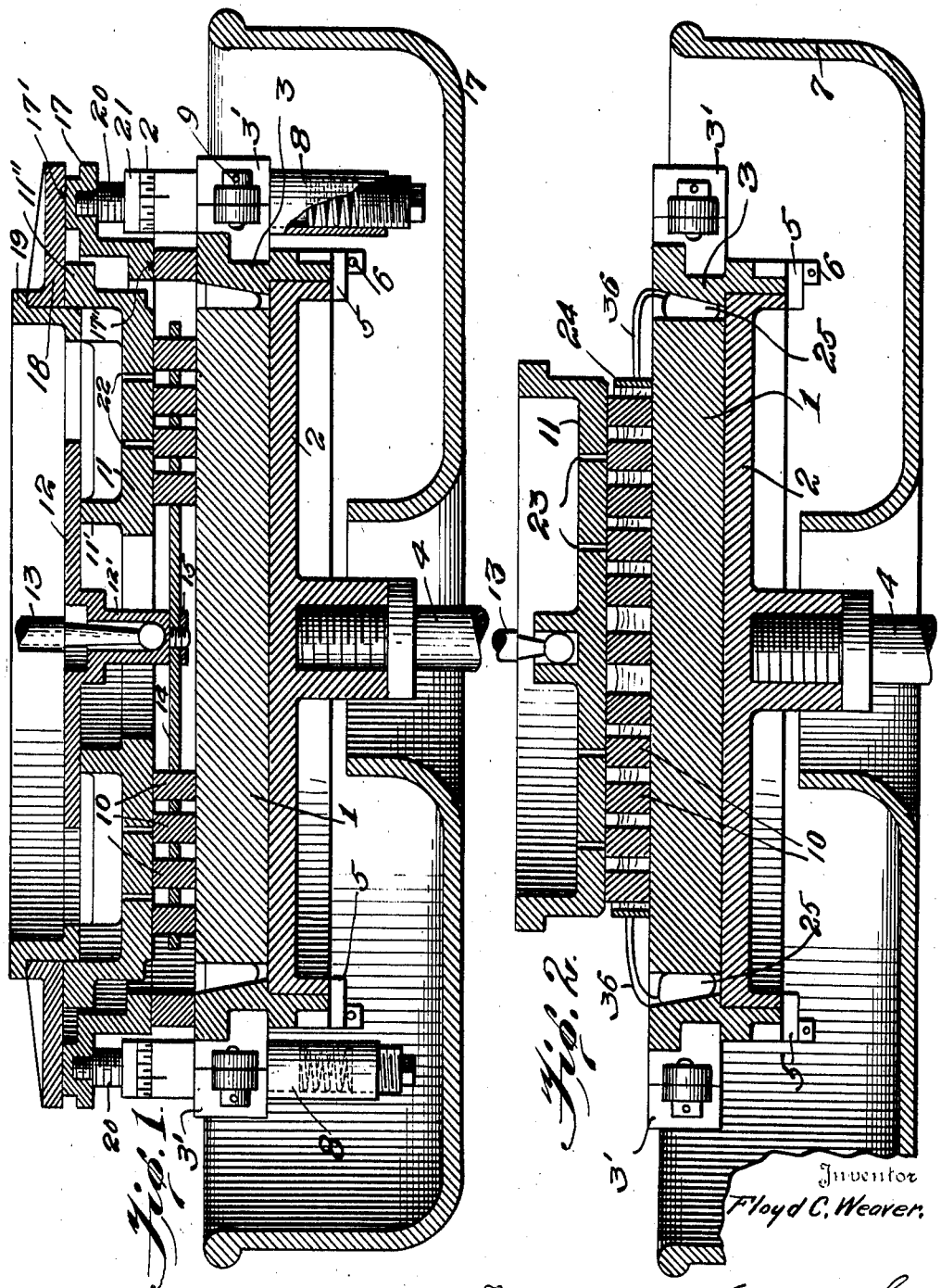
Inventor
Floyd C. Weaver.
By
His Attorneys.

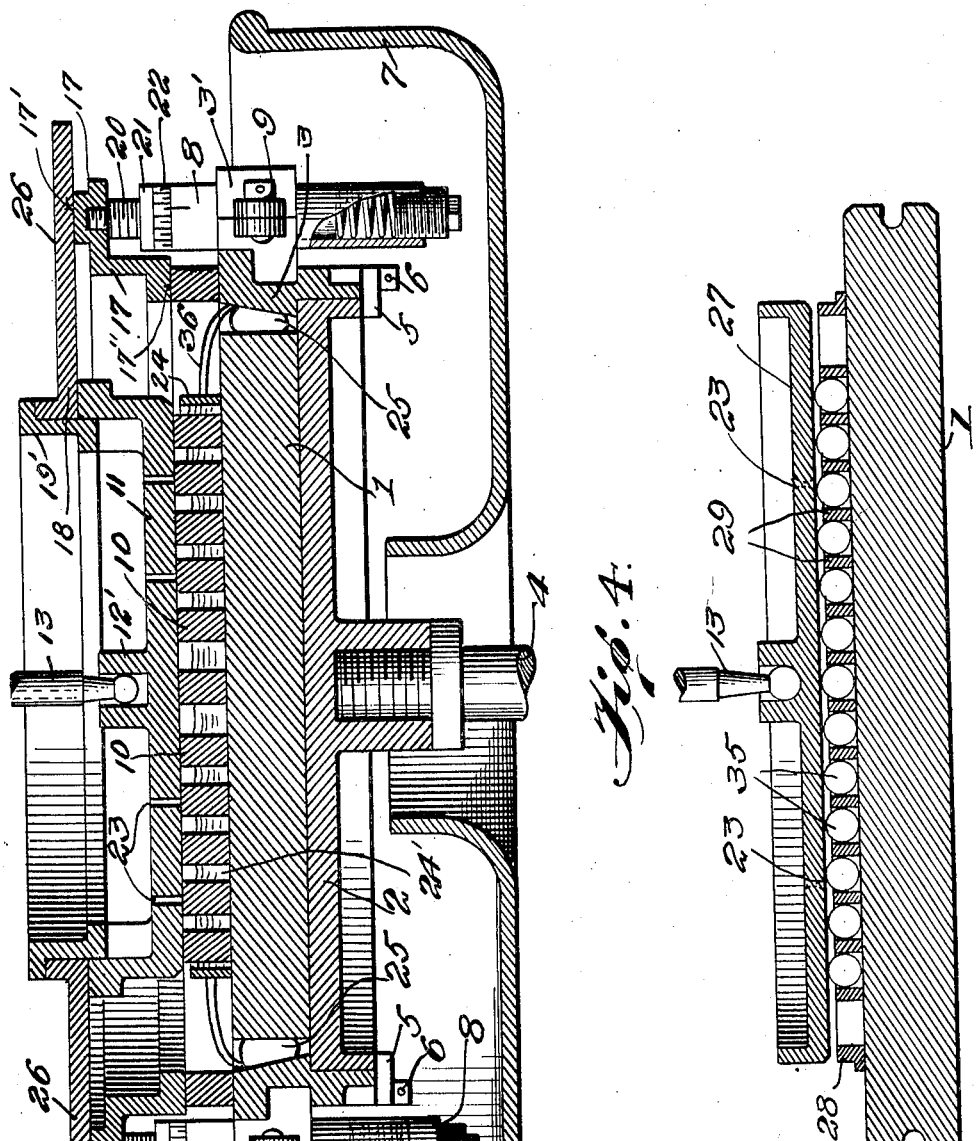

Dec. 11, 1923.
F. C. WEAVER
1,476,863
MACHINE FOR MAKING TRUE PLANE SURFACES
Filed Jan. 17, 1922      3 Sheets-Sheet 3
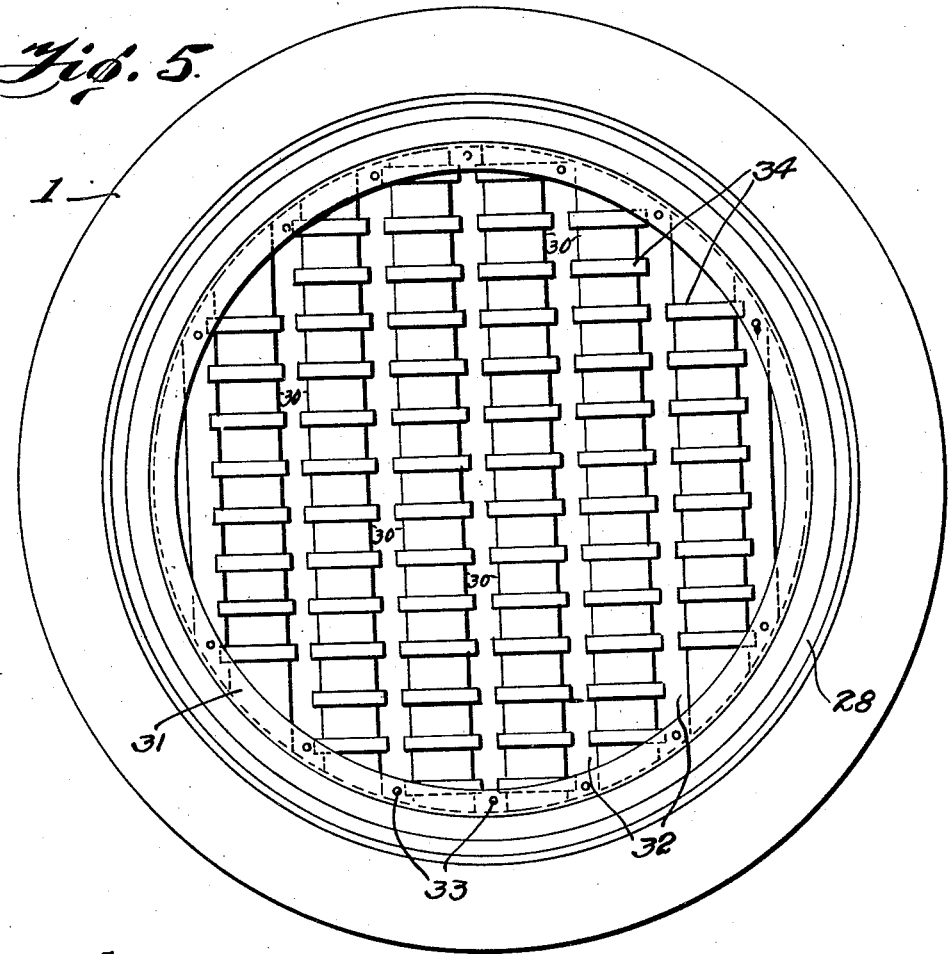
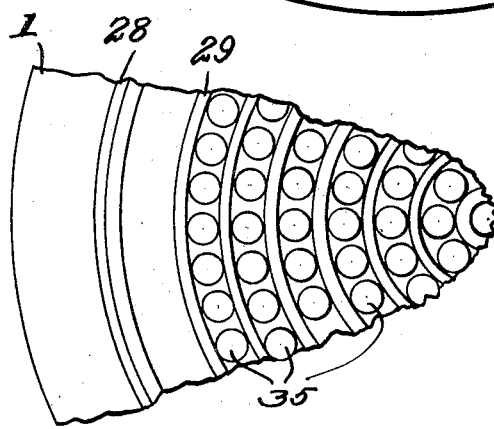
Inventor
Floyd C. Weaver,
His Attorneys.

Patented Dec. 11, 1923.

1,476,863

UNITED STATES PATENT OFFICE.

FLOYD C. WEAVER, OF WASHINGTON, DISTRICT OF COLUMBIA.

MACHINE FOR MAKING TRUE PLANE SURFACES.

Application filed January 17, 1922. Serial No. 530,007.

*To all whom it may concern:*

Be it known that I, FLOYD C. WEAVER, a citizen of the United States, residing at Washington, in the District of Columbia, have invented certain new and useful Improvements in Machines for Making True Plane Surfaces, of which the following is a specification, reference being had therein to the accompanying drawings.

This invention relates to a machine for making precision true plane surfaces and the object of this invention is the production of precision true planes or true plane surfaces and also of precision true plane surfaces precisely parallel to each other and at a given or designated separation from each other for any desirable or practicable material, such as glass, metal, natural crystals, et cetera, the surfaces to be plane and parallel to optical interference testing accuracy.

Another object of this invention is the production of optically plane and optically parallel surfaces at exact separations or lengths on end standards or gage blocks of metal, glass, crystals, et cetera.

Another object of this invention is the production of duplicate precision standards of length to the limit of accuracy attainable by optical interference methods of comparison now universally known, as well as to produce a precise duplication of a given end standard and to produce duplicate end standards of a given length or to within a specified amount above or below a nominal size for comparison work where differences of temperature coefficients of expansion are to be taken into account.

Another object of this invention is the production of precision lapped balls or spheres of any material to a given diameter or to duplicate any given diameter or to any given dimension denoted by an end standard or gage block and to optical interference accuracy.

Another object of this invention is the production of precision lapped cylinders of any practicable material to a given diameter or to any given diameter denoted by an end standard and to optical interference accuracy.

This invention will hereinafter be described in detail and the machine for accomplishing the objects above set forth is illustrated in the accompanying drawings, wherein Fig. 1 is a transverse sectional view through the one form of the lapping machine used in the rough lapping processes.

Fig. 2 is a transverse sectional view through the machine as assembled to permit the device to accomplish the final lapping process.

Fig. 3 is a transverse sectional view through a slightly different form from that shown in Fig. 1 for accomplishing the second or precision lapping process.

Fig. 4 is a transverse sectional view of the machine as employed for the purpose of lapping spheres.

Fig. 5 is a plan view of a part of the lapping machine, illustrating the manner in which cylinders are mounted upon the device when they are to be lapped.

Fig. 6 is a fragmentary plan view of the device illustrated in Fig. 4.

Referring specifically to the drawings by numerals, attention is invited to Fig. 1, wherein the rough lapping process of gage blocks 10 is accomplished by the lapping effort of the upper lapping plate 11 and the lower master plate 1 carried upon the work carrying plate 2, which is securely mounted upon the main machine vertical spindle 4. The gage blocks 10 are spaced properly between the master plate 1 and the lapping plate 11 by a thin plate 14 which has numerous perforations, in which the gage blocks 10 freely fit. The master plate 1 is accurately lapped to have plane and parallel faces (top and bottom) so that it fits evenly upon the work carrying plate 2. The work carrying plate 2 is accurately finished on top to properly receive plate 1 and an auxiliary ring 3. The top of ring 3 is lapped until the top of master plate 1 and the top of ring 3 are in one common plane, so that auxiliary ring 3 receives the secondary standard gage block 16 on the same fundamental base plane as gage blocks 10.

The thin plate 14 is secured to its carrying plate 12 by the bolt and nut connection 15. The carrying plate 12 in turn bears upon rim 11' of the lapping plate 11 and carries the working socket 12', which receives the driving or stroke pin 13. Thus it is apparent that thin plate 14 is supported by carrying plate 12, which in turn is supported upon the rim of plate 11.

The outer and upper rim 11'' of the lapping plate 11 is lapped plane and parallel to the lower lapping face of the plate 11, which bears upon the gage blocks 10. This rim 11″ bears accurately and firmly against the lower lapped plane surface of the carrying ring plate 18, which in turn is secured to the lapping plate 11 by the ring 19. Secured in this manner lower lapped plane surface of 18 is then parallel to lower lapping surface of the lapping plate 11, which bears upon the gage blocks 10. Thus plate 11 is free to float on top of the gage blocks 10 and is limited by ring 17 in both a lateral and vertical movement.

The ring 17, which may be termed a stop ring, is given two accurately lapped surfaces 17′ and 17″, which are parallel to each other, the surface 17′ bearing against the under surface of the carrying ring plate 18 as a limiting stop, as will hereinafter appear, while the surface 17″ bears upon the secondary standard or gage block 16. The stop ring is held against lateral movement by threaded studs 20 which project downward into sleeves 8 clamped in bosses 3′, formed upon the auxiliary ring 3, by bolts 9. Graduated nuts 22 and lock nuts 21 are mounted upon the studs 20, so that by adjusting the nuts 22 upon the upper ends of the sleeves 8 the studs 20 will be shifted vertically, so that the height of the stop ring 17 can be set to a given amount above the auxiliary ring 3 or to the height of secondary standard or gage block 16 and then be locked in position, thus permitting the removal of the secondary standard or gage block 16. The graduated nuts 22 also permit setting the height of stop ring 17 above auxiliary ring 3 a measurable amount in excess of the secondary standard or gage block 16, for any desirable purpose.

In cases where the weight of lapping plate 11 and the plates 12 and 18 is excessive, supporting springs are placed in the sleeves 8 to bear upwardly on the studs 20 and with adjusting tension screws in the bases of the sleeves 8 the downward pressure of the lapping plate 11 is controlled at will.

The master plate 1 is bound upon the work carrying plate 2 by the wedges 25 fitting upon its periphery and engaging the auxiliary ring 3, and the auxiliary ring 3 is in turn secured to the work carrying plate 2 by cleats 5 and screws 6. In this way a very firm support is provided for the master plate 1.

The lapping plate 11 is free to rotate and move in a very limited way laterally and to move freely downwardly upon the gage blocks 10 as the lapping proceeds in unison with the rotary movement of the thin plate 14 as it is driven by the driving or stroke pin 13, until this downward movement is limited by the stop ring 17, which by its setting determines the size or length of the gage blocks 10, in relation to the secondary standard or gage block 16. As the lapping proceeds abrasive medium is fed to the gage blocks 10 through the vents 23 formed through the lapping plate 11 and escapes out over the master plate 1.

In the rough lapping performed by this form of the machine the work carrying plate 2 is rotated by the spindle 4, which in turn is driven by any suitable means, which is not deemed necessary to be herein illustrated. At the same time the pin 13 is given suitable driving from suitable means, not shown, resulting in the free rotation of the lapping plate 11, the lapping plate being limited only in a very small lateral movement and in a downward movement by the ring 17, thus determining the final size of the gage blocks 10.

Attention is now directed to Fig. 3 of the drawings which permits of the precision lapping process of gage blocks 10. As illustrated, the lapping plate 11 is over the top surfaces of the gage blocks 10, which are mounted with the one previously lapped surface set securely upon the upper lapped surface of the master plate 1. The gage blocks 10 are secured on top the master plate 1 from lateral movement by a metal ring 24, which is slightly less in height than the gage blocks 10. The gage blocks 10 are set and spaced over the surface of the master plate 1 and the intervening spaces between the gage blocks themselves and the metal ring 24 are filled to the top of the ring 24 with a hard wax or resin 24′. The top of this wax or resin mass is made proof from harmful action, which would be otherwise caused by the abrasive medium, the abrasive medium being water, gasoline, et cetera. It is obvious that if the gage blocks 10 are to be very long they may be fitted in a perforated plate, which may be immersed in the wax or resin before the same hardens or the mass may be filled in around the perforated plate.

The ring 24 is secured from lateral movement over the master plate 1 by thin wedges 36 extending from the auxiliary ring 3 out over the upper surface of the master plate 1, to bear upon the periphery of the metal ring 24. These wedges 36 occupy only a small portion of the surface of the master plate 1 where it extends out beyond the metal ring 24 and said wedges 36 are two, four, six, or eight in number and are symmetrically spaced.

The master plate 1 is secured to the work carrying plate 2 in the same manner as it is in the machine shown in Fig. 1 and as above described, as is likewise true for the stop ring 17, the threaded studs 20, the nuts 21 and 22, the sleeves 8, the bolts 9, the auxiliary ring 3, the spindle 4, the bosses 3′, the cleats 5 and the screws 6.

The pan 7 illustrated in Figs. 1, 2, and 3, is provided to catch the refuse of the process, as the machines are in operation, as is apparent.

In the lapping operation the lapping plate 11 presses all the gage blocks 10 into firm engagement with the master plate 1 and since all the gage blocks 10 are set with hard wax or resin 24′, in addition to their being individually wroung to the master plate 1, the entire mass is practically as rigid as a solid casting. The lapping plate 11 is given a stroking movement over the upper surfaces of the gage blocks 10, set as above described, by the driving pin 13, which connects with the lapping plate 11 by its extension into the hub socket 12′. It is apparent that the lapping plate shown in Fig. 3 is mounted similarly to the lapping plate 11 in Fig. 1, by the ring carrying plate 26 being connected to it through the medium of the ring 19′. The ring plate 26 has a flat lapped surface underneath to bear upon the top lapped surface of the stop ring 17 and serves as a surface bearing plate to allow a free lateral movement of the lapping plate 11 over the upper surfaces of the gage blocks 10. Since the lower lapped surface of the carrying ring plate 26 is set fixed to the top edge of the lapping plate 11, which is lapped parallel to its lower surface, by setting the ring 17 by the secondary standard or gage block 16, the lower lapping surface of the lapping plate 11 is made to come to a limiting plane of stroking movement at a distance above the top surface of the master plate 1 equal to the height of the secondary standard or gage block 16.

When the gage blcks 10 are still too long the lapping plate 11 will operate upon the upper surfaces of the gage blocks 10 until they are reduced enough to allow ring 17 to support the entire weight of the lapping plate 11, the ring 19′ and the carrying ring plate 26, and forming a positive limiting stop, which is previously set according to the secondary standard or gage block 16. The abrasive medium is fed through the vents 23 of the lapping plate 11 directly upon the work and is discharged out over the top of the master plate 1. Also by setting the graduated nuts 22 on the studs 20 the stop ring 17 can be made to be a small amount higher than the amount necessary to give the exact length of the secondary standard or gage block 16 for the gage blocks 10, hence giving the desired stock for the finishing or subsequent operation on the surfaces of the gage blocks 10 when necessary.

When the weight of lapping plate 11 with its ring 19 and the carrying ring plate 26 is excessive, springs within the sleeves 8 bear upwards on the lower ends of the studs, 20, causing the stop ring 17 to bear upwards on the carrying ring plate 26, thus relieving the pressure downwards upon the tops of the gage blocks 10. This upward pressure of the springs in the sleeves 8 is made adjustable by a thumb screw at the bottom of the sleeves 8, thus causing a greater or less compression upon the springs, for the purpose set forth.

When the lapping has reduced the length or height of the gage blocks 10 to the amount originally set by the secondary standard or gage block 16, the ring 17 simply settles downward to the sleeves 8 coming in contact with the graduated nuts 22 locked in position by the nuts 21 on the studs 20. Thus by this arrangement the plate 11 comes into a final limiting position in precise relation to the precise datum plane, i e., the top surface of the master plate 1 and the top surface of the stop ring 3, determining the separation distance which is the length of the gage blocks 10.

Attention is now directed to Fig. 2, wherein is illustrated the machine in Figs. 1 and 3, with certain parts now removed, so that it may accomplish the optional polishing or final lapping of the gage blocks 10. The gage blocks 10 are mounted upon the master plate 1 in the same manner as that described for the operation of the machine in Fig. 3. The specific illustration shows that the carrying ring plate 26, and the ring 19′ are removed from their connection with the lapping plate 11 of Fig. 3. The sleeves 8 and the elements they support and the stop ring 17 are likewise removed, leaving the gage blocks 10 mounted upon the surface of the master plate, within the metal ring 24, the ring 24 being retained by the wedges 25 connected to the auxiliary ring 3.

The lapping plate 11 is now worked as before by driving or stroke pin 13 over the top of the gage blocks 10, but with very careful and measured strokes. The abrasive medium as before is fed through the vents 23 in the lapping plate 11. Thus by carrying the stroking region of the pin 13 to different portions of the surfaces of the gage blocks 10 in the metal ring 24 a greater lapping effort can be imposed upon the different portions at will. Hence the higher portions can thus be removed after their location. This permits the perfecting and final stage of the gage surfacing. When the gage block surfaces are to be optically polished the lapping plate 11 is provided with a polishing surface of prepared cloth or beeswax, et cetera, similar to the lapping surface and is operated in a similar manner over the top surfaces of the gage blocks 10. The polishing material is then fed through the vents 23 similarly to the working of the lapping abrasive mediums.

In the lapping of precision optical master surfaces the said surfaces are mounted as the blocks 10 upon the master plate 1. In the case of glass surfaces the master plate 1 is usually made of glass. In the case of working glass surfaces 10 the wax or resin is replaced by plaster of Paris or compounds having principally calcium carbonate.

In Fig. 4 there is illustrated the process of both the precision lapping of spheres and of cylinders. In the precision lapping of spheres the master plate is mounted as in Figs. 1, 2, and 3, although it is not deemed to be necessary to again illustrate in this figure this specific mounting of the master plate. The upper surface of the master plate 1 supports the spheres or balls 30 between the concentric ring bands 29, the bands being slightly less in height than the diameter of the spheres or balls. The spheres are placed in the annular spaces between successive bands, so as to take up as completely as possible the entire space. The bands are free to move over the surface of the master plate 1 and are made of similar material as the spheres 30 and are hardened so that they do not change with abrasive medium applied thereto. The outer band 28 is secured on the surface of the master plate 1 by such wedges 25 as illustrated in Fig. 3, which hold the ring 24, and forms the limiting stop for the movement of the spheres 35 and the concentric bands 29 in the lapping operation over the surface of the master plate 1. The lapping plate 27 is given a stroking motion over the spheres 35 by a driving or stroke pin 13, which is driven from some suitable source. An abrasive medium is fed to the under surface of the lapping plate 27 through vents 23 formed therein. The lapping plate 27 is used in the finishing stages as shown in Fig. 4, but in the preliminary process for general sizing of the spheres, the lapping plate 27 is mounted and operated in precisely the same manner as the lapping plate 11 and with all the accessories as described for the device illustrated in Fig. 3. To more clearly illustrate the manner in which the spheres 35 are mounted between the concentric bands, reference should be made to Fig. 6, which shows a fragmentary sectional view or the spheres 35 with the bands 29 on the upper surface of the master plate 1 and also the outer band 28.

The specific manner of lapping cylinders will be understood by referring to Fig. 5, which shows the arrangement for the precision lapping of cylinders 30 in a manner which is very similar to the manner of lapping the spheres in Figs. 4 and 6. The cylinders 30 are mounted upon the master plate 1 with the outer limiting band 28 secured therearound, this band being retained similar to the manner in which the band 24 is retained in Fig. 3. These cylinders are mounted in a movable annular ring 31 having the notched chord pieces or bars 32 so as to receive the loose fitting parallel sided flat bars 34. These bars 34 are secured by pins 33 to the annular ring 31. This annular ring 31 with the secured bars 32 is free to move over the master plate 1 within the area of the outer limiting ring 28. The cylinders 30 are then placed between the successive bars 34 held at each end by loose fitting vertical notches in the bars 32. Thus the entire combination of the annular ring 31 and bars 32 with the loose bars 34 and the cylinders 30 are free to move over the master plate 1 within the ring 28. The lapping is accomplished by a lapping plate such as 27 being operated as described for Fig. 4 and with the principal stroke of the pin 13 driving the lapping plate 27 in a direction normal to the axis of the cylinders or at small varying angles from a normal direction to the axis of the cylinders 35, or in the direction of the bars 32.

As the machines for performing the processes involved in the lapping has been set forth, I shall now set forth the specific processes. The precision lapping and the optical polishing of plane and plane parallel surfaces of gage blocks or of end standards, et cetera, is accomplished by three distinct process operations, following a precision mechanical to 0.0002" over nominal size of the gage blocks, et cetera.

The first sizing operation is done on the equipment shown in Fig. 1, where the gage blocks 10 are mounted in perforations of the thin plate 14 operated by the driving or stroke pin 13, and moved between the two independent plates 11 and 1. The master plate 1 is mounted upon the work carrying plate 2 and is rotated automatically or at the will of the operator, while the lapping plate 11 is lowered by the progress of the lapping of the ends of the gage blocks 10 until the carrying ring plate 18 rests upon the limiting or stop ring 17, which is previously adjusted for a fixed height or length of the secondary standard or gage block 16 or some desired final length of height of the gage blocks 10. Thus the lapping proceeds until the lapping plate 11, which is rigidly attached to the carrying ring plate 18 by means of ring 19, comes to the limiting position denoted by the position of the stop ring 17. Upon completion of the lapping, the lapping plate 11 is lifted off together with the thin plate 14, after the driving or stroke pin 13 is removed, thus leaving the gage blocks 10 then rough sized to 0.00005" on top of the master plate 1, which are then taken off and cleaned for inspection and preliminary measurements.

The second or precision lapping operation is done on the machine shown in Fig. 3. The gage blocks 10, after sizing operation, are carefully set in intimate contact on the master plate 1, i. e., by wringing, and the spaces between the gage blocks and the metal ring 24 are filled with hard wax or resin nearly to the level of the top edge of the ring 24 and then the exposed surface is proof-coated to resist action of liquids carrying the lapping abrasives, such as lime water, gasoline and oils, benzols, et cetera. After this wax or resin has hardened wedges 25 are carefully placed at symmetrical intervals, thus securing the ring 24 and the gage blocks 10 in the bed of wax or resin to the auxiliary ring 3, preventing displacement of the gage blocks during the lapping process. With the top surfaces of the gage blocks 10 cleaned with gasoline, the lapping plate 11 with the carrying ring plate 26 securely fastened by the ring 19 is carefully lowered to rest upon the tops of the gage blocks 10. Precaution is to be taken to insure the cleanliness of the lapping surface of the lapping plate 11 before putting the plate in position on top of the gage blocks 10. With the lapping plate 11 thus in place and the stop ring 17 set for the proper value according to the secondary standard or gage block 16, with the allowances set by the graduated nuts 22 and which are secured by the nuts 21, the pin 13 is connected and the lapping operation is started. As the lapping plate 11 is given a stroking motion by the pin 13, which is connected to suitable power sources, the master plate 1 fastened to the work carrying plate 2 on the vertical spindle 4 is rotated either automatically or at the will of the operator. Thus the top faces of the gage blocks 10 are reduced by the lapping effort of the plate 11 until the carrying ring plate 26 engages the stop ring 17, when the operation is completed. The stop ring 17 is set for the first surface to lap off approximately 0.000020" of the excess stock left by the first sizing operation, i. e., 0.000050". Thus there is left approximately 0.000030" for the second part of the precision lapping operation.

The second part of the precision lapping operation consists in removing the lapping plate 11 with the carrying ring plate 26 and the ring 19, as well as the stop ring 17 and the sleeves 8 and the studs 20 and nuts 21 and 22. After the wedges 25 are removed, the metal ring 24 is given a sharp rap with a hammer on the end of a soft wood block held tightly against the edge in a parallel plane to the surface of the master plate 1. This sharp blow causes no harm and is enough to start the ring 24 and the mass of wax or resin and gage blocks 10 loose from the surface of the master plate 1. In cases where all the gage blocks 10 do not come off readily the wax or resin is dissolved or chipped off and the gage blocks, slightly warmed, are then removed one at a time. Care is necessary at all times to preserve the surface of the master plate 1 from any injury, as its surface is kept in perfect condition as the primary reference surface, both of this process operation and the succeeding ones.

After removal of the gage blocks 10, with all parts, and the surface of master plate 1 is thoroughly cleaned, the gage blocks are reset with this last precision lapped surface down on the master plate 1, in the same manner as above described for the first precision lapped surface. The lapping then proceeds in the same way after replacing the stop ring 17 and the other rings associated therewith, the lapping plate 11 and the pin 13 in position as for the first surface, and the graduated nuts 22 are set for the final tolerance or excess stock amount, i. e., which should be approximately 0.000020". That is, this last operation of the precision operation should take approximately 0.000010" from the previously remaining 0.000030" and thus leaving the 0.000020" for the following final operation. The gage blocks 10 are again removed as before and are cleaned for inspections and tests. Thus the gage blocks are ready for the final perfecting lapping and optical polishing stage.

The perfecting lapping and the optical polishing process is done on the machine shown in Fig. 2, where the gage blocks 10, lapped in the preceding process to within 0.000020" over size, are now carefully set or wrung on the master plate 1. The stop ring 17, the studs 20, the nuts 21 and 22, the sleeves 8, the carrying ring plate 18 and the ring 19 are all removed, leaving the lapping plate 11 free for stroking by the pin 13 over the top surfaces of the gage blocks 10 for either the lapping or polishing. In the final lapping a suitable abrasive medium is fed through the vents 23 in the lapping plate 11 to the gage blocks 10. The lapping in this precision stage is again only on one surface at one time. This first lapping stage is intended for the removal of approximately 0.000010", with very frequent tests by optical flat and standard gage set on the extending portion of the master plate 1 beyond the ring 24, thus readily and precisely following the dimensional progress of the work.

Following this lapping operation where the highest finish is secured the optical polishing is proceeded with in a similar manner. The lapping plate 11 is coated on the lapping surface with a polishing pad of wax or pitch made flat against a plane master surface while still plastic from heating and then allowed to cool. This surface is then cut by grooves making a checked pattern as is done for the metal lapping plate 11 and vents 23. In operation the plate 11 with its polishing pad and polishing compound are worked by stroke pin over the top surfaces of the gage blocks 10 in precisely the same manner as for the lapping operations. The master plate 1 on the carrying plate 2 is either rotated automatically or at the will of the operator. Upon completion of this top surface of the gage blocks 10 with an optical polish and answering the interference tests for flatness the gage blocks 10 are then removed as heretofore described and then reset upon plate 11 with the polished surface wrung on the top surface of the master plate 1. With the setting of band 24 et cetera and the wedges 25 the lapping of the last face of the gage blocks 10 is begun. The gage blocks 10 at this stage have approximately 0.000010" to be removed. The lapping plate 11 is first given a series of symmetrical stroking movements by pin 13 and then the gage blocks are carefully tested after removing the lapping plate 11 by an optical master flat surface and a standard gage set upon the extending portion of the master plate 1 beyond the ring 24. Thus the exact dimensional or length chart is made of the gage blocks 10, showing which portion of the whole is the highest and where greater lapping is necessary to bring all the gage blocks 10 to precisely the same length. In case of a section of the gage blocks 10 having a greater length the center of the lapping plate 11 is shifted to have a series of short circular or elliptical strokes over the particular high portions, which is accomplished by operating master plate 1 to bring these high portions at will to a point of maximum lapping effort. Thus by following each measured period of lapping effort of the lapping plate 11 by testing with an optical master surface and the standard gage as above described gage blocks 10 can be brought down step by step to the final value, which in practice means this last lapping and correcting should be carried approximately to within 0.000003" of final size.

With the completion of this perfecting stage of lapping, the gage blocks 10 are now given an optical polish as above described for the first surface. During the progress of the polishing frequent tests with the optical master surface and standard gage will prevent in some cases excessive polishing and the reduction of the remaining stock or more than the 0.000003". Generally this polishing can be carried to within 0.000002" or less for final size, leaving the gage blocks 10 optically polished, optically plane surfaced, optically plane parallel faced, and precisely the given length to within 0.000002" or less over nominal value, without any marring of a previously given finish to the now lapped faces or surfaces. Both glass and metal blocks 10 are worked in similar ways. The original setting of the blocks 10 are slightly different when the master plate 1 is made of glass and when the gage blocks 10 are glass and the resin between the gage blocks 1 is replaced with plaster of Paris or compounds which are principally calcium carbonate.

The process for lapping precision spheres and precision cylinders is done upon the equipments or machines shown in Figs. 2 and 3. The arrangements of the spheres 35, as shown in Figs. 4 and 6, with the system of movable concentric bands 29 are placed upon the master plate 1 within the band 28, which is secured by wedges 25, as shown in Fig. 3, and the lapping plate 11 is operated in precisely the same manner as above described for the gage blocks in Figs. 1, 2, and 3. The lapping plate 11 is stroked by pin 13 and the master plate 1 is rotated either automatically or at will of the operator. The first stages of lapping are accomplished on the machine shown in Fig. 3, with the lapping plate 11 secured to the carrying ring plate 26 by means of the ring 19, thus the lapping may be continued until the ring plate 26 comes into contact with the stop ring 17 set for the secondary standard or gage block 16 which in turn determines the size of the spheres 35. After completion of this first stage of the lapping plate 11 can be removed and prepared for the final perfecting lapping as shown in Fig. 2, where all the operating processes for the gage blocks 10 are repeated for the spheres 35 mounted as shown in Figs. 4 and 6. The diameters of the spheres 35 are directly measured by an optical master surface and a standard gage, as before described for the gage block 10. Thus the size of the spheres is controlled as readily as in the case of the gage blocks 10, due to the principle of the two successive concentric ring bands 29 binding the spheres 35 at two points in addition to the point of contact of the spheres with the master plate 1, giving a vice grip upon the spheres as the lapping plate 11 is driven over the top contact of the spheres. The action of the lapping plate 11 bearing on the spheres 35 in the direction of the movement of the lapping plate 11 or the relative movement of the lapping plate 11 to the master plate 1. The concentric ring bands 29 prevent or resist individual movement of the spheres 35, and the resulting composite effect of the rolling spheres is a crowding of the ring bands together at points where the motion of the lapping plate 11 is in the direction of a radius of the bands, thus clamping the spheres between two successive bands and the lapping plate 11 removing the high projecting portions of the spheres. The stroke pin 13 is given a series of symmetrical strokes to give a maximum lapping effort in a variety of directions closely approximately the radii of the bands 29. In lapping spheres 35 by the machine shown in Fig. 3, the diameters of such spheres can be brought to within 0.000100" of desired size readily and in the final lapping as shown in the machine illustrated in Fig. 4, the diameters of the spheres can be brought to the limit of 0.000050".

In the process of lapping precision cylinders, the machine shown in Fig. 3 is used as above described for spheres throughout, excepting that the pin 13 is given a principal direction normal to the axis of the cylinders 30 or at varying small angles to a normal direction. The parallel sided and hardened bars 34 fitting loosely in notches in the bars 32 perform the same function as the bands 29 in the case of the spheres 35 of Figs. 4 and 6. In operation the annular ring 31 in Fig. 5 and the bars 32 are placed upon the master plate 1 and then the limiting outer band 28 is secured by wedges 25, the same as they retain the metal band 24 in Fig. 3, and the rectangular bars 34 are dropped into their respective notches in the bars 32. The cylinders 30 previously machine ground to within 0.00005" of diameter are dropped in the pockets between successive bars 34 and bearing on the surface of the master plate 1. The top lapping plate 11 of Fig. 3, with its ring plate 26 and the ring 19, is then put in place with the lapping surface of the plate 11 resting on the upper portions of the cylinders 30 and the stop ring 17 adjusted to the secondary standard or gage block 16 and the lapping operation is then proceeded with in the manner hereinbefore set forth for the gage blocks 10.

By referring to the foregoing description of the machines for accomplishing the several processes hereinbefore set forth, it is apparent that certain changes may be made in the construction of the machines, without departing from the spirit of the present invention, as long as the changes do not exceed the scope of the invention as claimed, while the machines as constructed will efficiently operate for accomplishing the processes set forth. It is also apparent, after referring to the process operations set forth, that the objects of the present process, as set forth in the objects of this invention in the first part of this specification, are properly and fully accomplished.

Having described the present invention, what is claimed as new is:

1. In a device of the character described, the combination of a work carrying plate, means for supporting and revolving the carrying plate, a master plate resting upon the upper surface of the carrying plate, an auxiliary ring fitting over the periphery of the work carrying plate and extending above and below the carrying plate, cleats carried by the auxiliary ring and fitting under the carrying plate for binding the ring in position, wedges carried between the auxiliary ring and the periphery of the master plate for binding the master plate in a set position upon the carrying plate, and a rotatable and vertically movable lapping plate carried above the master plate, as and for the purposes set forth.

2. In a device of the character described, the combination of a work carrying plate, means for supporting and revolving the carrying plate, an auxiliary ring carried upon the periphery of the carrying plate, a master plate carried upon the carrying plate, sleeves removably carried upon the outer portions of the auxiliary ring, studs vertically movable within said sleeves, graduated nuts rotatable upon said studs and bearing upon the upper ends of said sleeves, whereby the studs may be vertically adjusted, a revolvable lapping plate positioned above the master plate, a ring connected to the lapping plate a carrying ring plate connected to the ring and the lapping plate, a stop ring carried by said studs, said lapping plate, said ring, and said carrying ring being adapted to rotate as a unit until said ring plate engages said stop ring, whereby the movement of the lapping plate toward the master plate is stopped, as and for the purposes set forth.

3. In a device of the character described, the combination of a work carrying plate, means for supporting and rotating the carrying plate, a master plate mounted upon the carrying plate, a lapping plate rotatably and vertically movable above the master plate, a ring removably connected to the lapping plate, a carrying ring plate removably connected to the ring, and means removably mounted upon the carrying plate for engaging the carrying ring plate at a predetermined time for stopping the movement of the lapping plate toward the master plate, as and for the purpose set forth.

4. In a device of the character described, the combination of a work carrying plate, means for supporting and rotating the carrying plate, a master plate supported upon the carrying plate, an auxiliary ring clamped over the edge of the carrying plate, the upper surface of the auxiliary ring being in the same common plane with the upper surface of the master plate, a stop ring vertically adjustable above the auxiliary ring, a lapping plate rotatable and vertically movable above the master plate, a ring removably connected to the lapping plate, a carrying ring plate removably connected to the ring, whereby the carrying ring plate, the ring, and the lapping plate will rotate as a unit, until the carrying ring plate engages the stop ring, a removable secondary standard or gage block carried between the stop ring and the auxiliary ring, thereby adjusting the position of the stop ring, and thus causing the movement of the lapping plate toward the master plate to be stopped at a predetermined point, as and for the purposes set forth.

5. In a device of the character described, the combination of a work carrying plate, means for supporting and revolving the carrying plate, a master plate carried upon the carrying plate, sleeves, means supporting said sleeves upon said work carrying plate, studs vertically movable within said sleeves, graduated nuts rotatable upon said studs and bearing upon the upper ends of said sleeves, whereby the studs may be vertically adjusted, a revolvable lapping plate positioned above the master plate, a ring connected to the lapping plate, a carrying ring plate connected to the ring and the lapping plate, a stop ring carried by said studs, said lapping plate, and said carrying ring being adapted to rotate as a unit until said ring plate engages said stop ring, whereby the movement of the lapping plate toward the master plate is stopped, as and for the purposes set forth.

In testimony whereof I hereunto affix my signature.

FLOYD C. WEAVER.